(12) United States Patent
Westbrook (10) Patent No.: US 10,036,849 B2
(45) Date of Patent: Jul. 31, 2018

(54) COMPENSATION OF FIBER LENSING EFFECT DURING GRATING FABRICATION IN MULTICORE FIBER

(71) Applicant: OFS Fitel, LLC, Norcross, GA (US)

(72) Inventor: Paul S Westbrook, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 209 days.

(21) Appl. No.: 14/202,552

(22) Filed: Mar. 10, 2014

(65) Prior Publication Data

US 2014/0312014 A1    Oct. 23, 2014

Related U.S. Application Data

(60) Provisional application No. 61/799,881, filed on Mar. 15, 2013.

(51) Int. Cl.
| | |
|---|---|
| *G02B 6/02* | (2006.01) |
| *B23K 26/00* | (2014.01) |
| *B23K 26/0622* | (2014.01) |
| *B23K 26/066* | (2014.01) |
| *B23K 103/00* | (2006.01) |

(52) U.S. Cl.
CPC ...... *G02B 6/02133* (2013.01); *B23K 26/0006* (2013.01); *B23K 26/0057* (2013.01); *B23K 26/066* (2015.10); *B23K 26/0624* (2015.10); *G02B 6/02042* (2013.01); *G02B 6/02138* (2013.01); *B23K 2203/50* (2015.10)

(58) Field of Classification Search
CPC ............. G02B 6/02042; G02B 6/036; G02B 6/02133; B23K 26/0006; B29D 11/00769

USPC ..................................................... 219/121.69
See application file for complete search history.

(56) References Cited

U.S. PATENT DOCUMENTS

| | | | | |
|---|---|---|---|---|
| 4,807,950 A | * | 2/1989 | Glenn ...................... | G02B 5/18 |
| | | | | 359/34 |
| 5,745,617 A | * | 4/1998 | Starodubov ........ | G02B 6/02138 |
| | | | | 359/566 |

(Continued)

FOREIGN PATENT DOCUMENTS

WO    WO2012/168293    * 12/2012    ............... G03H 1/04

OTHER PUBLICATIONS

Askins, et al., "Inscription of Fiber Bragg Gratings in Multicore Fiber," OSA/BGPP, 2007.*

(Continued)

*Primary Examiner* — Tu B Hoang
*Assistant Examiner* — Erin McGrath
(74) *Attorney, Agent, or Firm* — Wendy W. Koba, Esq.

(57) ABSTRACT

An arrangement and method that compensates for variation in grating strength associated with forming multiple gratings in multicore fiber is proposed where the writing efficiency of the beam(s) used to form the gratings is controlled to compensate for fiber lensing effects. In one case, a spacing between the multicore optical fiber and the beam source is controlled such that the writing efficiency (which decreases as a function of the space between the source and the fiber) compensates (at least in part) for the increased beam intensity attributed to the lensing effect of the fiber itself. The width of beam itself may also be controlled to modify the writing efficiency.

15 Claims, 7 Drawing Sheets

(56) References Cited

U.S. PATENT DOCUMENTS

| | | | | |
|---|---|---|---|---|
| 5,903,690 | A * | 5/1999 | Starodubov | C03B 32/00 385/123 |
| 6,275,631 | B1 * | 8/2001 | Jang | G02B 6/02142 385/123 |
| 6,483,965 | B1 | 11/2002 | Napier et al. | |
| 8,123,400 | B2 | 2/2012 | Andrejco et al. | |
| 2003/0113064 | A1 * | 6/2003 | Poladian | G02B 6/02042 385/37 |
| 2007/0201793 | A1 | 8/2007 | Askins et al. | |
| 2014/0126029 | A1 * | 5/2014 | Fuetterer | G02B 5/1857 359/3 |

OTHER PUBLICATIONS

"Multi-core fiber Bragg grating developments for OH suppression," Proc. SPIE 8450, Modern Technologies in Space- and Ground-based Telescopes and Instrumentation II, 84503L (Sep. 13, 2012); doi:10.1117/12.925791, Min et al.*

* cited by examiner

COMPENSATION OF FIBER LENSING EFFECT DURING GRATING FABRICATION IN MULTICORE FIBER

CROSS-REFERENCE TO RELATED APPLICATIONS

This application claims the benefit of U.S. Provisional Application Ser. No. 61/799,881, filed Mar. 15, 2013 and herein incorporated by reference.

TECHNICAL FIELD

The present invention relates to an arrangement for creating grating structures in multicore optical fibers and, more particularly, to an arrangement that controls the writing efficiency of the beam(s) used to form the gratings to compensate for fiber lensing effects; more generally, controlling the strength of gratings inscribed in multicore fiber as a function of the gratings' positions across the width of the fiber.

BACKGROUND OF THE INVENTION

In most cases, grating structures (such as Bragg gratings) are formed in an optical fiber core by irradiating the fiber from the side (i.e., in a direction transverse to the length of the fiber) with a UV beam (i.e., actinic radiation) that introduces a patterned change in the refractive index of the core region. The amount of change in refractive index that is created is defined as the "strength" of the grating, where a large change in refractive index (i.e., large $\Delta n$) is defined as a "strong" grating. As is well known, the periodicity of this change is used to control the properties of the grating, including the wavelength(s) filtered or passed by the structure.

Figure 1:
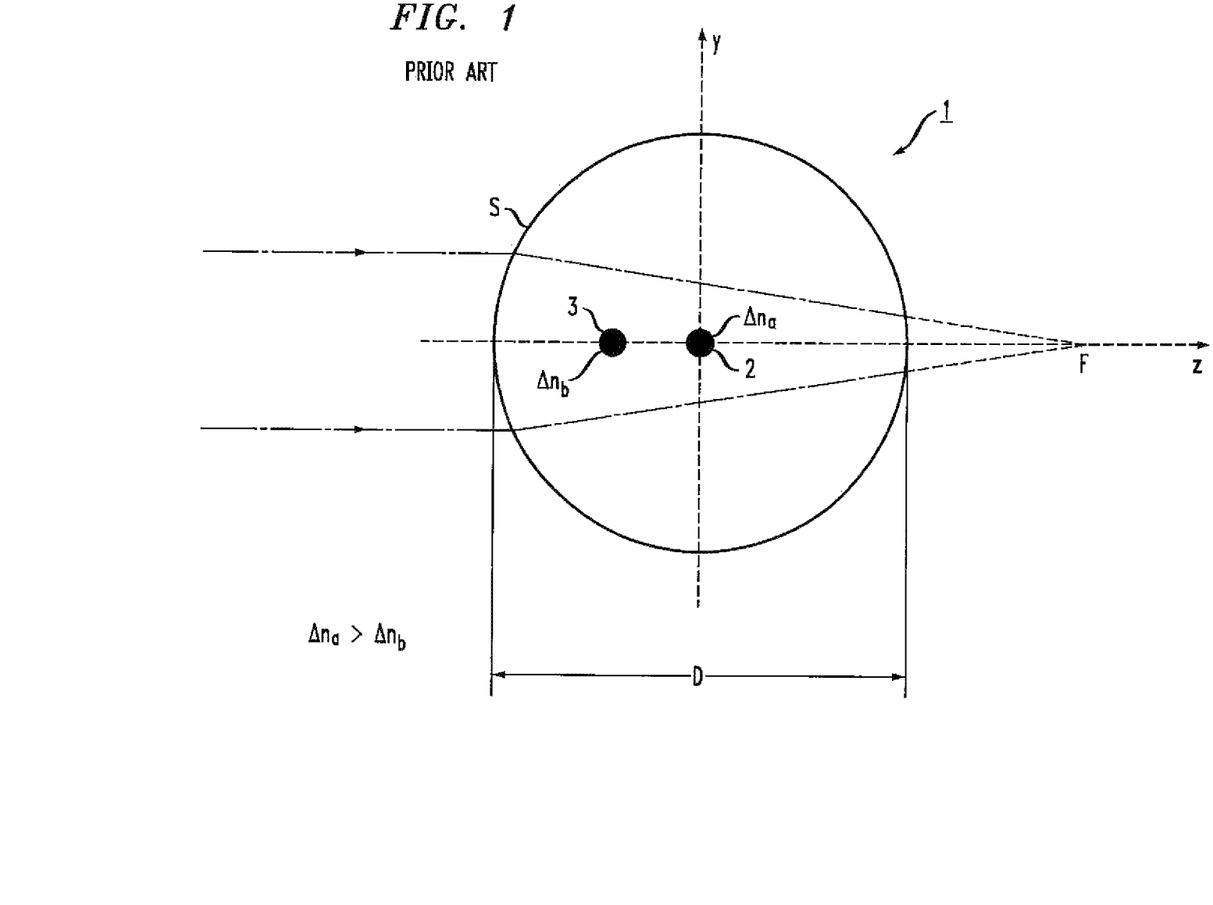
FIG. 1 is a side view of a multicore fiber, illustrating the lensing effect of the fiber's cylindrical contour on the beam used to inscribe ratings within each core.

When attempting to form gratings in multicore fibers, undesirable variations in the "strength" of the grating formed in each separate core region will occur, as a result of the lensing properties of the fiber itself. FIG. 1 illustrates this principle. A side view of an exemplary multicore fiber 1 is shown, where multicore fiber 1 includes a first core 2 in essentially the center region of the fiber and a second, offset core 3. In this particular orientation, offset core 3 is shown as being offset to the left of first core 2 along the z-axis direction.

A beam 4, used to create grating structures within both first core 2 and offset core 3, is shown as illuminating multicore fiber 1 from the left-hand side. Beam 4 may be defined as a writing beam ray. As a result of the curved surface S of multicore fiber 1, beam 4 will converge as it passes through the diameter D of multicore fiber 1. Therefore, multicore fiber 1 can be said to exhibit the property of a cylindrical lens, causing beam 4 to focus during its propagation across the width of the fiber. In this particular example, beam 4 ultimately focuses at a point F beyond multicore fiber 1.

As a result of the beam focusing, the intensity of the beam increases as it passes through the width of the fiber. While not a problem with standard single-core fibers, this variation in beam intensity as a function of position across the fiber diameter is problematic to the process of inscribing gratings in multicore fibers. In particular, the increase in intensity will naturally increase the strength of the grating formed within the various core regions, as the beam propagates from the left to the right. For the arrangement as shown in FIG. 1, therefore, the strength of a grating formed in offset core 3 will be less than the strength of a grating formed in first core 2. First core 2 is identified as having a grating with a refractive index difference $\Delta n_a$ and offset core 3 is identified as having a grating with a refractive index difference $\Delta n_b$, where $\Delta n_a > \Delta n_b$. Non-uniformity in grating strength is typically an undesirable result.

Moreover, if a multicore fiber becomes twisted during grating inscription, a given core will experience varying intensity along its length. Therefore, the grating strength of a structure formed along a length of a twisted core will also vary longitudinally along the length of the fiber. In at least the circumstance where the multicore fiber gratings are used as a shape sensor, variations in grating strength along a given core will require larger dynamic range in any interrogator that processes the light scattered from this variable-strength grating.

For these reasons and others, it is desirable to reduce variations in grating strength present in multicore fibers.

SUMMARY OF THE INVENTION

The needs remaining in the prior art are addressed by the present invention, which relates to an arrangement that compensates for variation in grating strength associated with forming multiple gratings (in multicore fiber) and, more particularly, to an arrangement that that controls the writing efficiency of the beam(s) used to form the gratings to compensate for fiber lensing effects; more generally, controlling the strength of gratings inscribed in multicore fiber as a function of the gratings' positions across the width of the fiber.

In accordance with one embodiment of the present invention, a spacing between a multicore optical fiber and a beam source (for inscribing gratings in each core) is controlled such that the writing efficiency (which decreases as a function of the space between the source and the fiber) compensates (at least in part) for the increased beam intensity attributed to the lensing effect of the fiber itself. The width of beam itself may also be controlled to modify the writing efficiency.

In one embodiment, the present invention comprises a method for controlling grating strength created in multiple core regions in a multicore fiber, comprising the steps of providing a beam source for creating interfering and overlapping beams forming an interference pattern, an overlapped region defined as an interferogram region, providing an optical fiber including multiple core regions disposed along a length thereof, irradiating a side surface of the multicore optical fiber with the created interference pattern from the beam source, a lensing effect of the side surface creating a lensing effect that increases intensity of a beam passing therethrough and adjusting a spacing between the beam source and the multicore optical fiber such that the multicore optical fiber is disposed at a location within the interferogram region where a decrease in writing efficiency of the interferogram compensates for an increase in beam intensity to control the strength of the created multiple gratings.

Various and other aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

As mentioned above, the process of inscribing gratings in multicore optical fibers is hampered by the fact that the fiber itself acts as a cylindrical lens, focusing the writing beams as they pass through the width of the fiber. In the particular case of a multicore fiber with UV-inscribed Bragg gratings, the increase in beam intensity means that each core will have a different grating strength, an undesirable result.

In accordance with the present invention, as will be described in detail below, the lensing effect of the optical fiber shape is compensated by modifying the writing efficiency of the beam used to create the multiple gratings so that a variation in writing efficiency across the diameter of the fiber can be created that compensates (at least in part) for the variation in grating strength attributable to the lensing effect.

Figure 2:
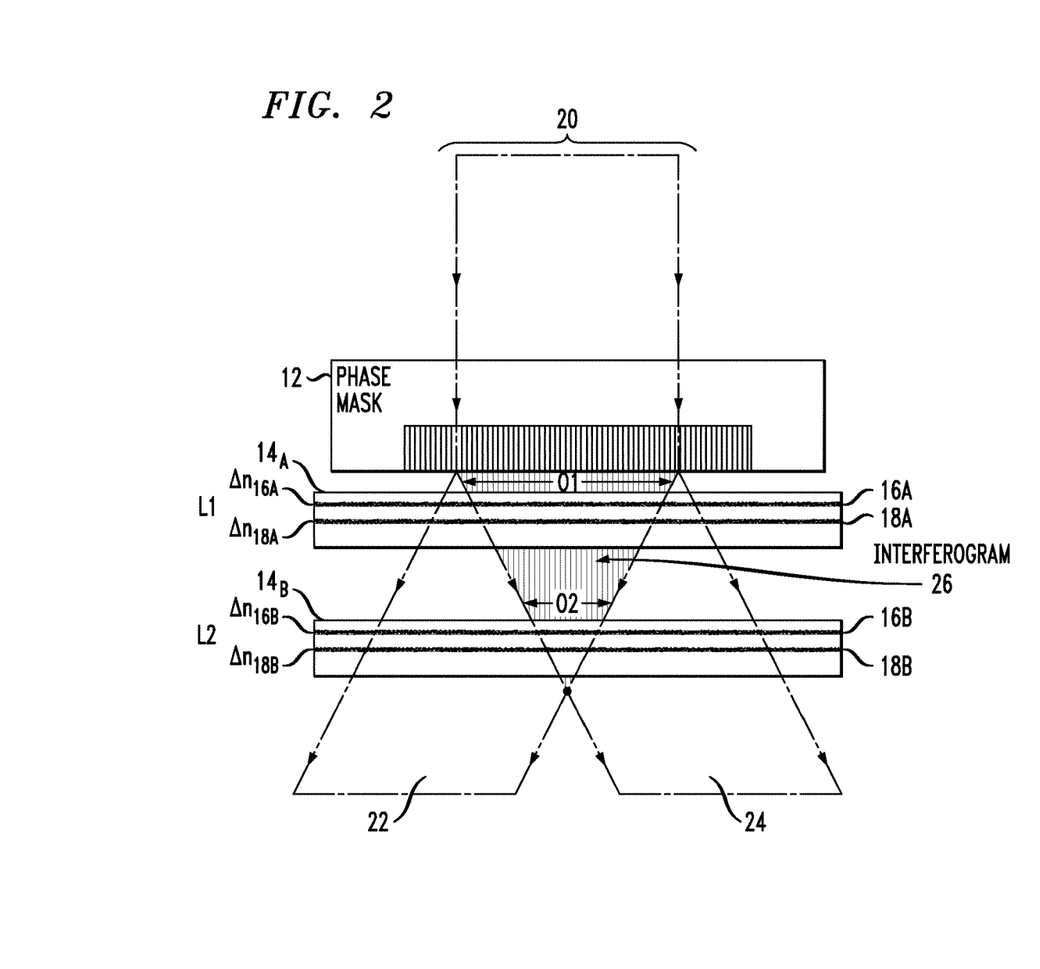
FIG. 2 illustrates an exemplary embodiment of the present invention, using a phase mask to create a writing beam.
Figure 3:
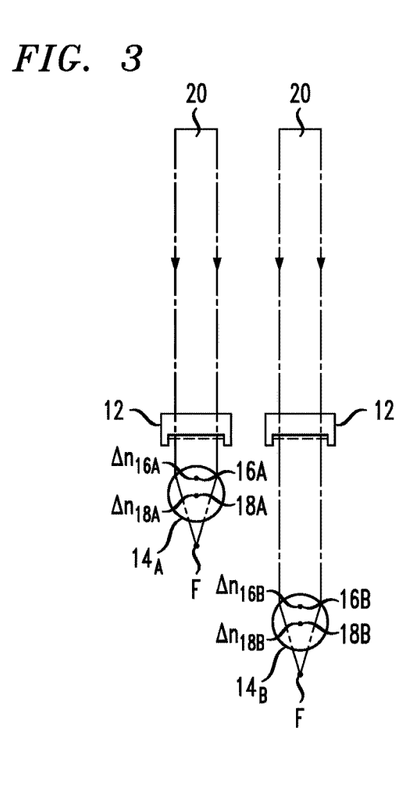
FIG. 3 is a side view of the embodiment of FIG. 2, showing the lensing effect of the fiber source on the writing beam as it passes through the fiber.

FIG. 2 illustrates an arrangement 10 formed in accordance with an exemplary embodiment of the present invention that mitigates the effects of fiber lensing on grating strength by controlling the separation between a phase mask 12 (used to create the specific grating pattern) and a multicore optical fiber 14. In this particular embodiment, multicore optical fiber 14 is illustrated at two different locations, a first location L1 that is positioned relatively close to phase mask 12 (i.e., a narrow spacing between the grating and multicore fiber 14A) and a second location L2 where multicore fiber 14B is separated by a larger spacing from phase mask 12. A side view (illustrating the lensing properties of surface S of multicore fiber 14) is shown in FIG. 3. In this particular embodiment, multicore fiber 14 is shown as including a first core region 16 and a second core region 18. A writing beam 20 is shown as passing through phase mask 12 and irradiating the side of multicore fiber 14.

The focusing property of surface S increases the intensity of beam 20 as it passes through multicore fiber 14, thus creating a grating along second core region 18 that is stronger than the grating created along first core region 16 (i.e., $\Delta n_{18} > \Delta n_{16}$). It is this differential intensity of the beam as it passes through the fiber that is addressed in this embodiment of the present invention by controlling the spacing between the beam and the fiber to adjust the efficiency of the writing beam in accordance with this embodiment of the present invention.

Figure 4:
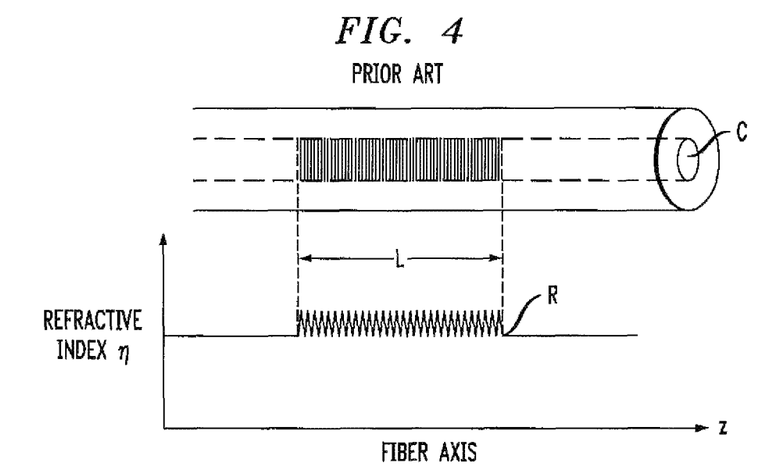
FIG. 4 is an exemplary illustration of the modification of refractive index within an optical fiber core as is used to create a grating structure.

Referring to FIG. 2, it is shown that incoming writing beam 20 is separated into two beam components 22 and 24 as it passes through phase mask 12. These two beams will then overlap and interfere with one another, this interference between the beams creating a fringe pattern. It is this fringing effect that inscribes the patterned change in refractive index along the fiber's core region, as is well known in the art. FIG. 4 illustrates this property, which shows a section of a core region C that has been patterned to exhibit this change in refractive index R. Incoming writing beam 20 may be scanned across phase mask 12 to produce a grating of extended length, and/or modulated in some fashion (phase or amplitude) as it is translated along the phase mask to inscribe a grating with a desired profile. Such inscription systems are sometimes referred to as "point-by-point" or "direct-write" systems.

Returning to FIG. 2, the region where beam components 22 and 24 overlap and interfere with each other is defined as an interferogram region 26. In this case where a phase mask is used to create the writing beam, interferogram region 26 is triangular in shape. The so-called writing efficiency (in this case, proportion the number of interference fringes created by the overlapping beams) of arrangement 10 can be thought of as a function of the extent of overlap between the two beams. With multicore fiber 14 disposed at location L1, it is clear that the length of beam overlap is relatively long (shown as O1 in FIG. 2). The efficiency of the writing process is therefore relatively high, since a grating of an appreciable length can be formed by this exposure.

On the other hand, if multicore fiber 14 is disposed at location L2, it is clear that the extent of overlap between beam components 22 and 24 has been significantly reduced (shown as O2 in FIG. 2). The writing efficiency is thus reduced when compared to position L1.

Applying these principles of variation in writing efficiency to the problem of intensity variation from beam focusing, it follows that first core region 16A and second core region 18A in the closer-positioned multicore fiber 14A experience a relatively small variation in writing intensity, since this variation is proportional to the ratio of the length of fringe pattern occurring in each core (somewhat longer along first core region 16A, and therefore a higher efficiency as the beam is scanned from left to right across the mask). Referring to lower fiber 14B, there is a larger difference in writing efficiency, since the ratio of the two fringe pattern lengths is smaller (since fiber 14B is closer to apex A of triangular interferogram region 26). Naturally, the writing efficiency beyond point A goes to zero. Therefore, by positioning multicore fiber 14B at location L2, the decrease in writing efficiency is used to offset the beam intensity attributed to lensing, providing an arrangement where the strength of the multiple gratings will be relatively uniform.

The effect of lensing on the writing beam passing through the fiber is independent of the location of the fiber with respect to the phase mask, as shown in FIG. 3. Thus, the differential intensity between cores arising from lensing may be compensated (in whole or in part) by controlling where the fiber is placed within the interferogram, which controls the writing efficiency of the arrangement.

Figure 5:
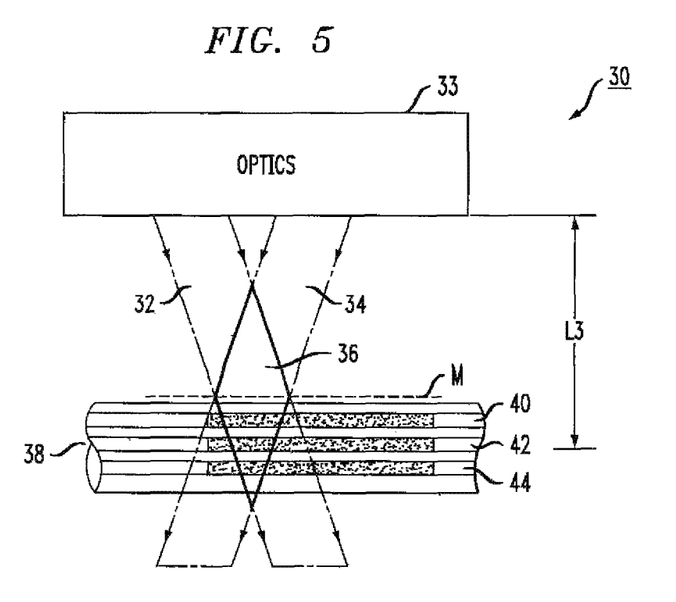
FIG. 5 illustrates another embodiment of the present invention, in this case using a pair of modulated optical beams to create the writing beam.

FIG. 5 illustrates an alternative embodiment of the present invention, in this case shown as arrangement 30 which utilizes a pair of overlapping input beams (in place of a phase mask) to inscribe a grating in a multicore fiber. As shown in this top view of arrangement 30, a first beam 32 and a second beam 34 are shown as created by an optical source 33. First beam 32 and second beam 34 are disposed such that they interfere in a manner that creates a diamond-shaped interferogram 36. If this type of beam source were to be used with a conventional, single core fiber, the fiber would be positioned such that its core coincides with the midpoint M of interferogram 36, since this is the location of maximum writing efficiency (i.e., maximum extent of the overlap between first beam 32 and second beam 34). In accordance with the present invention, mitigating the effects of lensing and its resultant creation of multiple gratings of differing strengths in a multicore fiber is achieved by locating a multicore fiber 38 at a location within interferogram region 36 where the beam overlap is reduced (i.e., where the writing efficiency is reduced).

Referring to FIG. 5, multicore fiber 38 is shown at a location L3 with respect to midpoint M of interferogram region 36. Multicore fiber 38 is shown in this example as having a set of three separate core regions, shown as 40, 42 and 44 in FIG. 5. The lensing effect attributed to the cylindrical shape of multicore fiber 38 results in the intensity of the beam at the position of core region 44 being the greatest (as the beam is focusing). The beam intensity at the position of core region 40 is somewhat less, with the intensity at the middle core region 42 being between these two values.

In accordance with the present invention, by positioning multicore fiber 38 at a location within interferogram region 36 where the writing efficiency decreases as the beam intensity increases, it is possible to compensate for the intensity increase and create a set of three gratings with essentially the same grating strength (that is, essentially the same $\Delta n$).

The following paragraphs describe in detail the interaction between beam writing efficiency and lensing-induced radial intensity in accordance with the present invention. It is to be understood that an approximate treatment using ray tracing and the paraxial wave approximation is employed in this analysis.

Figure 6:
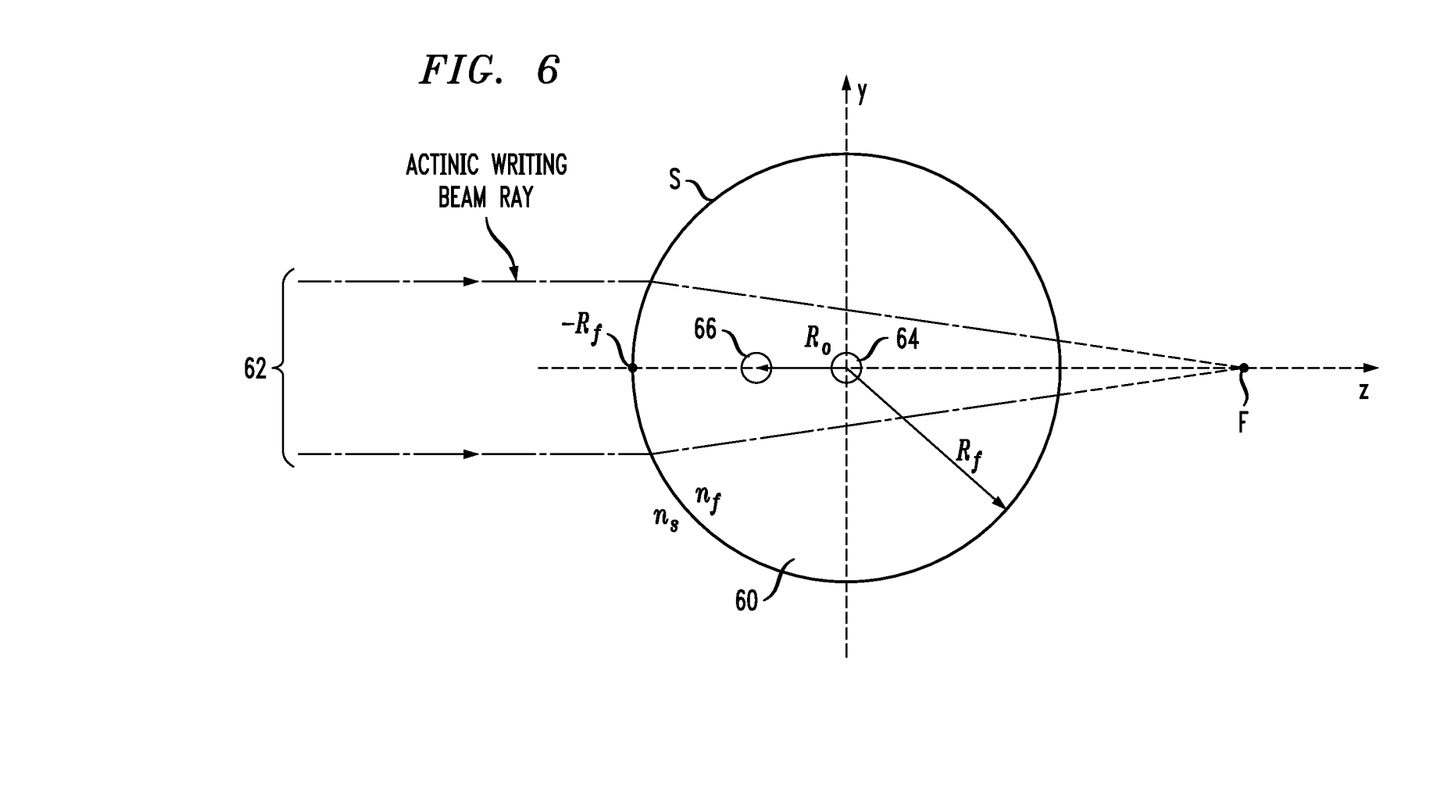
FIG. 6 is a detailed illustration of a side view of a multicore optical fiber, defining a set of parameters attributing to the lensing effect of the fiber surface.

FIG. 6 is an enlarged view of an exemplary multicore fiber 60 (similar to the diagram shown in FIG. 1). As shown, an incoming beam 62 is focused by surface S of fiber 60, with the rays of beam 62 extending beyond fiber 60 shown as dotted lines, converging at focal point F. A central core region 64 and an offset core region 66 are also shown. The following parameters are associated with this diagram:

$R_f$=radius of fiber 60
$R_o$=spacing between center of core 64 and core 66
$n_f$=refractive index of fiber 60
$n_s$=refractive index of ambient surrounding fiber 60

With these definitions, it is possible to define the magnification factor M of the beams as a function of the coordinate z in the thin lens approximation arising from the cylindrical fiber surface. The magnification factor can be defined as the ratio of beam intensity at a location z within the fiber and a point $z=-R_f$ at the left-hand face of fiber 60. In particular, this magnification factor M as a function of location z across the diameter of optical fiber 60 (that is, M(z)) is defined as follows:

$$M(z) = \frac{\frac{n_f}{n_s}}{\left(\frac{z}{R_f}\right)\left(1 - \frac{n_f}{n_s}\right) + 1}.$$

Using this relation, the magnification can be computed for a particular case. For example, presume that fiber 60 is a silica fiber ($n_f$=1.5) in an air ambient ($n_s$=1). Fiber 60 is a standard fiber having a diameter of 125 µm (i.e., $R_f$=62.5 µm). It is presumed that the offset between core regions 64 and 66 (shown as $R_O$ in FIG. 6) is 30 µm. Using these values, the magnification factor at the center of core region 64, M(0), is found to be 1.5. For the offset core region 66, M(30 µm) is equal to 1.21. It is this variation in magnification factor that results in a weaker grating inscription being formed along offset core 66 if the compensating techniques of the present invention are not utilized.

As discussed above for the phase mask arrangement shown in FIG. 2, the writing beams overlap less in the x-direction away from the mask (i.e., moving toward the apex of the triangular interferogram); that is, the writing efficiency of the beam decreases. Thus, if the writing beam is scanned from left to right along the optical fiber in the z-axis direction, the grating strength at any given point along the fiber is proportional to the writing efficiency (i.e., the extent of overlap between the two beams). While the writing efficiency decreases with distance from the phase mask, the lensing effects described above increase with distance from the mask. In accordance with at least one embodiment of the present invention, therefore, these two considerations can be made to cancel out each other (either completely or at least partially). In general, it can be seen that the writing efficiency decreases linearly with position from the phase mask. The writing efficiency $\eta$ as a function of position from the mask (z) can be defined as follows:

$$\eta = 1 - \frac{z}{z_{max}}, \text{ where}$$

$$z_{max} = \frac{B}{2}\sqrt{\left(\frac{\lambda_B}{n_{eff}\lambda_a}\right)^2 - 1},$$

B is the width of the incoming writing beam, the quantity $\lambda_B(n_{eff}\lambda_a)$ is defined as the vacuum Bragg wavelength of the inscribed grating, $\lambda_a$ is the vacuum wavelength of the writing beam, $n_{eff}$ is the effective index of the core mode at the Bragg wavelength $\lambda_B$ and $z_{max}$ is the distance between the mask and the apex of the interferogram triangle.

Taking into consideration a finite displacement $d_{fm}$ between the phase mask and the fiber, as well as the refraction at the fiber surface, and shifting the z coordinate zero to the center of the fiber (as shown in FIGS. 5 and 6), it can be shown that the writing efficiency decreases linearly as the beam passes through the width of the fiber. The relation defining writing efficiency can then be expressed as follows:

$$\eta = 1 - \frac{z}{z_{max}}, \text{ where}$$

$$z_m = \frac{B}{2}\left(\sqrt{n^2 a^2 - 1} - \frac{2d_{fm}}{B}\frac{\sqrt{n^2 a^2 - 1}}{\sqrt{a^2 - 1}}\right) \text{ and}$$

$$a = \frac{\lambda_B}{n_{eff}\lambda_a}.$$

In this analysis, it is presumed that $n=n_f$, defining the refractive index of the fiber itself (and the refractive index of the surrounding material is assumed to be of unity value; i.e., $n_s=1$). The quantity $z_m$ is defined as the position of the interferogram apex, measured with respect to the fiber surface facing the phase mask (after taking into account the effects of refraction at the fiber surface).

It can be shown that in the regions where the thin film lens approximation is valid, the effect of radial beam intensity variation from lensing and writing efficiency variation along its interferogram can be manipulated to create multiple gratings of essentially uniform strength within a multicore fiber. For regions where the thin film lens approximation is not valid, the modification of writing efficiency will at least lessen the difference in strength between the multiple gratings.

Figure 7A:
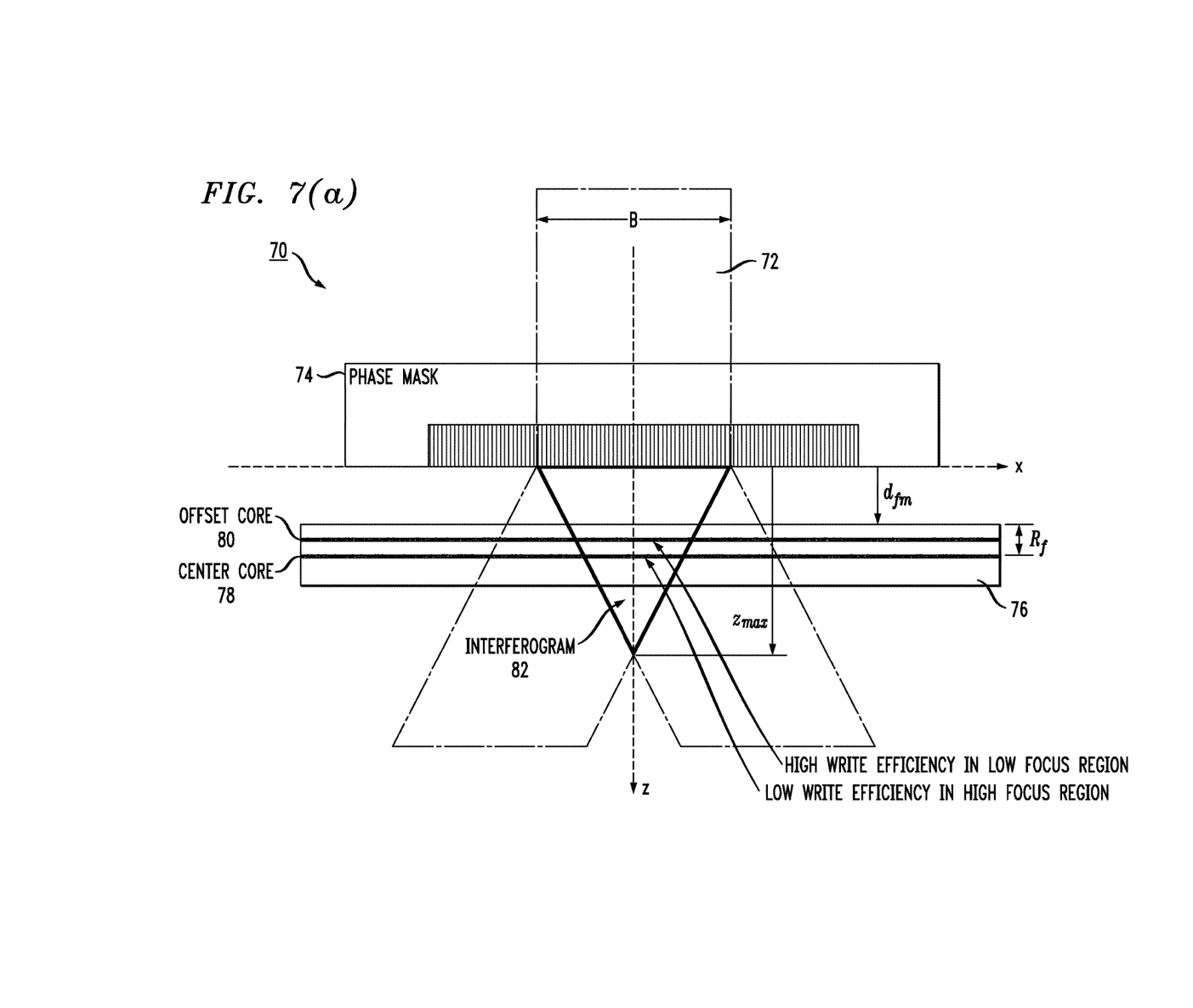
FIG. 7(a) is a detailed illustration of a configuration similar to that of FIG. 2, in this case defining a set of parameters associated with controlling a spacing between the phase mask and the multicore optical fiber.

A more complete definition of beam writing efficiency can be understood with respect to the configuration shown in FIG. 7(a) (similar to the embodiment of the present invention as illustrated in FIG. 2), with reference to the coordinate system shown in FIG. 6. When a writing beam 72 is scanned from left to right across a phase mask 74, the grating modulation at a given position x along a multicore fiber 76 (including core regions 78 and 80) can be expressed as an integral over the exposure time at that location:

$$\Delta n_{mod}(x,z) \propto M(z) \int_0^{T_{scan}} F_{mod}(vt-x,z,t)dt.$$

The y dependence of the writing beam propagation is included in the magnification factor M(z). Here, $F_{mod}$ is defined as the interferogram modulation, v is the scan speed and $T_{scan}$ is the duration time of the scan. When performing a grating inscription using a phase mask, $F_{mod}$ oscillates at the phase mask fringe period $$\frac{\Lambda_{phase\ mask}}{2},$$

and has a spatial extent along x that depends on the overlap of the writing beams. Explicit time dependence is included for the cases where the beams (or phase mask) are directly modulated (e.g., with piezo drives, or phase or amplitude modulators). For a "top hat" beam (such as shown in FIG. 7(a)), the overlap extent forming interferogram 82 decreases linearly with distance from the phase mask. The writing efficiency is proportional to the time integral of the interferogram modulation, where for the top hat beam this means that the writing efficiency is simply proportional to the overlap of the two beams. Under these conditions, a write efficiency parameter ($\eta(x,z)$) can be defined as follows:

$$\eta(x,z) = \int_0^{T_{scan}} F_{mod}(vt-x,z,t)dt \propto \text{beam overlap},$$

with writing efficiency normalized to unity at the input side of the fiber through the normalization of $F_{mod}$.

Assuming linear dependence of the inscribed modulation on the dosage of the UV radiation used to create the structure, the grating modulation will be proportional to the product of the magnification factor and the writing efficiency:

$$\Delta n_{mod}(z) \propto M\eta = \frac{\frac{n_f}{n_s}\left(1 - \frac{z}{z_{max}}\right)}{\left(\frac{z - d_{fm} - R_f}{R_f}\right)\left(1 - \frac{n_f}{n_s}\right) + 1}.$$

If the actual relationship between the grating modulation and the radiation dosage is nonlinear, the effect of lensing will only be partially mitigated. Beam shapes other than "top hat" may also be used (such as generalized to a Gaussian beam). Again, changes in the beam profile may also result in only partial mitigation of the lensing effect.

With these assumptions, it is possible to select the parameters that will remove the dependence of the magnification factor $M\eta$ with position z. In particular, the z dependence is removed if the value of $z_m$ (i.e., the apex of the interferogram region projected from within the fiber after refraction) is defined as follows:

$$z_m = \frac{n}{n-1} R_f.$$

Figure 7B:
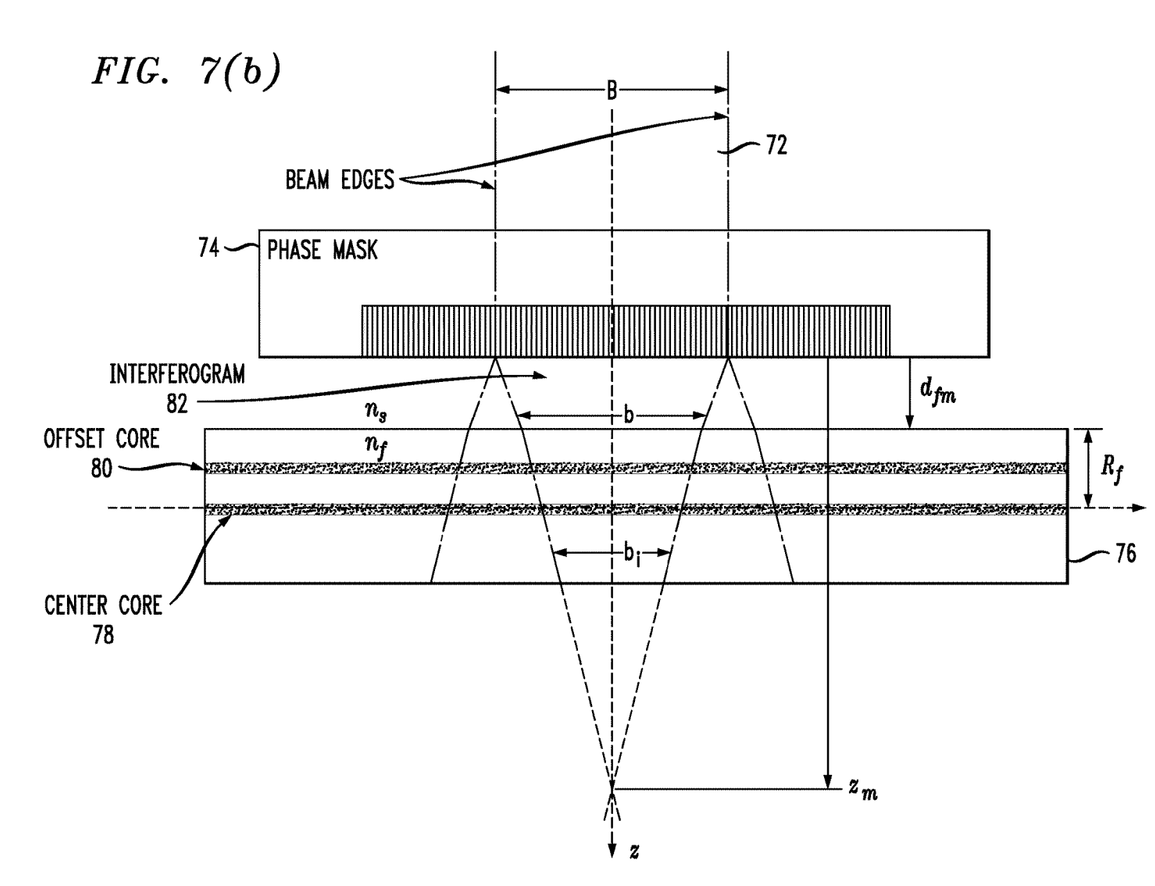
FIG. 7(b) is a detailed illustration similar to that of FIG. 7(a), but in this case taking into consideration the effects of refraction at the surface of the multicore optical fiber.

FIG. 7(b) illustrates modifications used in the analysis when refraction at the fiber surface is taken into account. Referring to FIG. 7(b), achieving independence between magnification factor and position can be achieved by adjusting the beam size and distance between the fiber and the mask so that:

$$d_{fm} = \frac{B}{2}\sqrt{a^2 - 1} - R_f\left(\frac{n}{n-1}\right)\sqrt{\frac{a^2 - 1}{n^2 a^2 - 1}},$$

where it is understood that $n=n_f$ (i.e., the refractive index of the fiber itself) and the refractive index of the surrounding material is unity (i.e., $n_s=1$). Note that this condition implies that the apex of the interferogram triangle occurs at the same point z as the focal point of the converging rays. Both of these convergence points, in fact, may occur outside of the physical boundary of the fiber itself and may there be computed by projecting the lensing and overlap outside of the fiber (as shown by the dashed lines for lensing in FIG. 6, as well as the overlap of the dashed lines in FIG. 7(b)).

Applying this formula to a specific case, it is presumed that the beamwidth B=200 μm, $R_f$=62.5 μm, n=1.5, $\mu_B$=1550 nm, $n_{eff}$=1.44, and $\lambda_a$=244 nm, then $d_{fm}$ must be adjusted to a value of 306 μm.

It is to be understood that the above computation is an approximation of the full solution, using a thin lens approximation for the lensing effect. Additionally, this solution is most accurate for rays close to the fiber axis. In particular, the solution for refraction at the fiber surface does not take into account the fiber curvature, which will slightly alter the value of $z_m$ for off-axis rays. More broadly, the techniques of this example utilize ray tracing concepts and do not take into account diffractive effects. While treatment of these effects will increase the accuracy of the computation, the benefits of adjusting writing efficiency to compensate for lensing effects without this additional effort is appreciable.

While this discussion has been associated with the use of a phase mask to create the interfering writing beams, similar arguments may be applied to inscription using the modulation arrangement as shown in FIG. 5. Moreover, it is possible to modulate the beam and translate it along the fiber, thus inscribing gratings via "direct" (or point-by-point) inscription.

Figure 8:
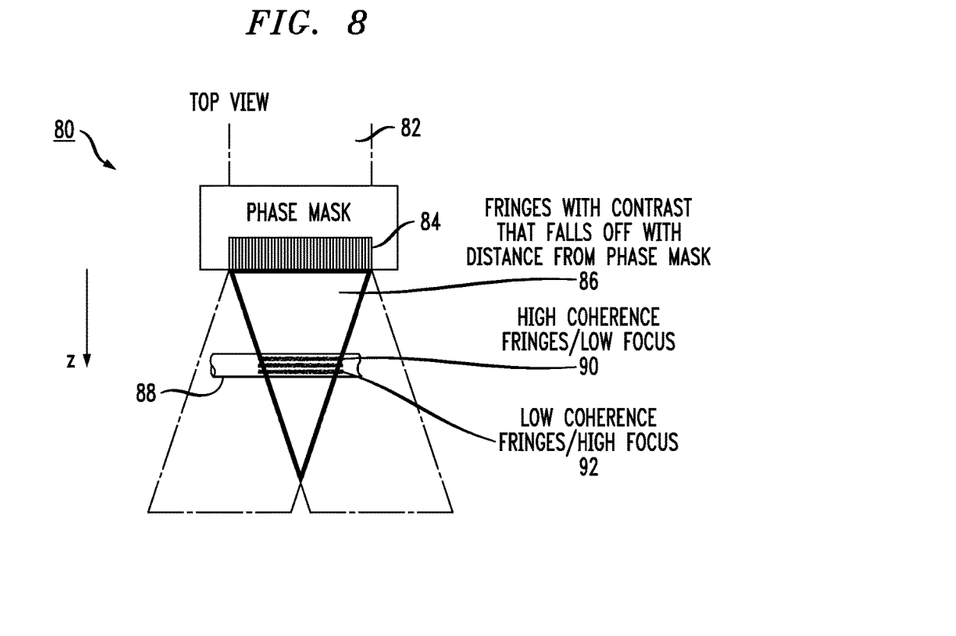
FIG. 8 illustrates another embodiment of the present invention, in this case using a low coherence optical signal source.

FIG. 8 illustrates another embodiment of the present invention, in this case showing an arrangement 80 compensating for the lensing effect of the fiber surface by using a relatively incoherent light source. As shown, a large beam 82 is incident on a phase mask 84. It is presumed for this case that the beam has limited transverse spatial coherence. Also shown in FIG. 8 is an interferogram region 86 created by the beam passing through phase mask 84. As shown, the fringe visibility within interferogram region 86 decreases with distance from phase mask 84.

In accordance with the present invention, it is possible to compensate for grating variations associated with fiber lensing by positioning multicore fiber 88 at a position with respect to phase mask 84 where a decreased fringe visibility will result in inscribing a relatively weak grating in the core regions further from the phase mask. In this case, multicore fiber 88 is shown as including a first core region 90 and a second core region 92, with second core region 92 illuminated by a beam with lower coherence fringes than that illuminating first core region 90. The fiber lensing effect results in the beam intensity being higher along second core region 92. Thus, the weaker coherence mitigates, at least in part, the increased beam intensity.

In this case of reduced coherence, the width of the beam does not have to be small. For example, if the transverse spatial coherence is defined as $B_{coh}$, this value can be defined as the effective beam width B, replacing B with $B_{coh}$ in the above equations for a large incoherent beam. Inasmuch as the transverse spatial coherence is typically not a step function, the mitigation may not be perfect; however, there will be an improvement over prior art arrangements, since the writing efficiency declines within the trailing part of the interferogram. Arrangement 80, as shown in FIG. 8, applies to both phase mask-produced grating structures and point-by-point-produced grating structures.

Figure 9:
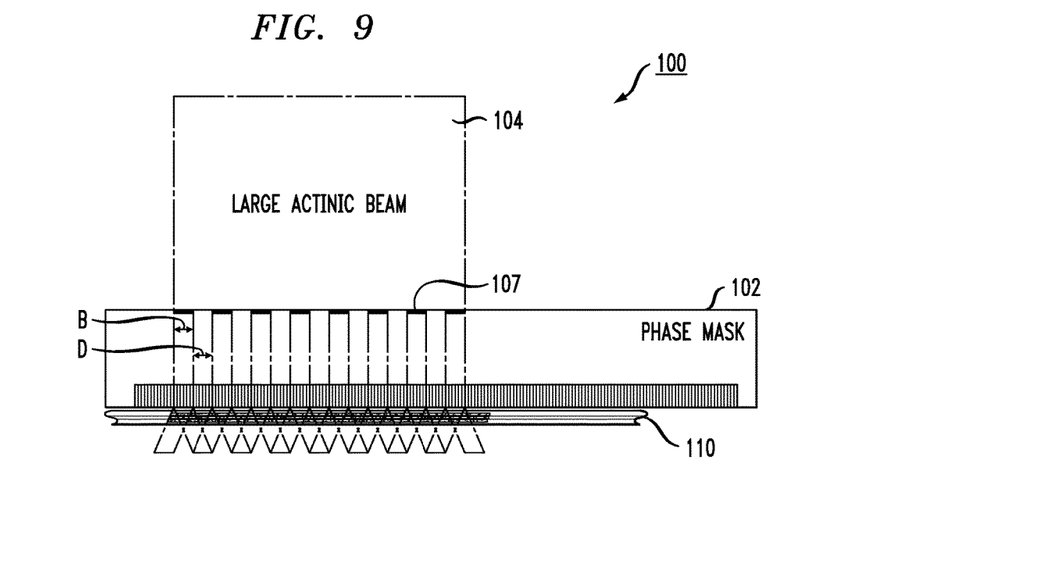
FIG. 9 illustrates yet another embodiment of the present invention, in this case using a plurality of separate writing beams to mitigate the lensing effects of the optical fiber.

FIG. 9 illustrates yet another embodiment of the present invention, in this case in the form of an arrangement 100 that again uses a phase mask 102. In this case, a a large input beam 104 is separated into a plurality of individual beams 106, each of width B and separated by a distance D. The dimensions and spacing of individual beams 106 is defined by a plurality of apertures 107 formed in phase mask 102. Each of the individual beams 106 will have its associated lensing-based intensity increase mitigated by decreasing overlap as in the previous examples.

In particular, by translating writing beam 104 along fiber 110, a long grating may be inscribed while using only relatively narrow beams. The beam size is controlled by the apertures used to divide the incoming writing beam 104 into the plurality of individual beams 106.

Another advantage of this embodiment is that if the grating is written with a single, ultrafast pulse (such as on a draw tower), gratings can be increased over a long length while still maintaining the fringe spacing and phase that is associated with the mask. In contrast, if several such gratings where written in succession with different pulses, any motion of the fiber with respect to the mask would reduce the phase coherence between the individual inscribed gratings. Note that in this case the mitigation will not be complete inasmuch as the grating will be "short" on the far side of the fiber and "long" on the near side, resulting in gratings with different spectral characteristics. Nonetheless, a certain degree of mitigation of the lensing effect will be observed.

While all of the above embodiments were configured to provide an arrangement where the beam writing efficiency was controlled to compensate for the lensing effect, it should be understand that the two variables of writing efficiency and beam intensity (i.e., increased intensity as a result of focusing) may be controlled to provide any desired result. For example, it is also possible to accentuate the variation in grating strength between different cores, rather than mitigate it.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for controlling a strength of gratings created in multiple core regions of a multicore optical fiber, comprising the steps of
providing a beam source which emits overlapping writing beams from a beam source to form an interference pattern including an overlapped portion defined as an interferogram region, with a number of interference fringes created by the interferogram region defining a writing efficiency of the beam source;
positioning the multicore optical fiber in proximity to the beam source such that the beam source irradiates a side surface of the multicore optical fiber, where the interference pattern from the overlapping writing beams passes through a width of the multicore optical fiber such that a lensing effect of the side surface increases an intensity of the writing beams passing through the multiple core regions;
and
adjusting a spacing between the beam source and the multicore optical fiber such that the multicore optical fiber is disposed at a location within the interferogram region where a decrease in writing efficiency of the beam source compensates for an increase in beam intensity such that a difference in the strength of gratings created in different core regions of the multicore optical fiber is minimized; and emitting the overlapping writing beams from the beam source to create the gratings in the multiple core regions of the multicore optical fiber.

2. The method as defined in claim 1 wherein the method further comprises the step of:
translating a position of the beam source along a length of the multicore optical fiber to create multiple gratings of predetermined lengths.

3. The method as defined in claim 2 wherein the method further includes the step of modulating the interferogram region as the beam source is translated along the multicore optical fiber.

4. The method as defined in claim 3 wherein the interferogram region is phase modulated.

5. The method as defined in claim 3 wherein the interferogram region is amplitude modulated.

6. The method as defined in claim 1 wherein the writing efficiency is defined by controlling a degree of beam overlap between the writing beams.

7. The method as defined in claim 1 wherein the writing efficiency is defined by controlling the coherence of the writing beams.

8. The method as defined in claim 7 wherein the writing efficiency is defined by controlling a spatial coherence of the writing beams.

9. The method as defined in claim 7 wherein the writing efficiency is defined by controlling a temporal coherence of the writing beams.

10. The method as defined in claim 1 wherein a phase mask is used with the beam source to create the interferogram region.

11. The method as defined in claim 10 wherein the interferogram region is a triangular shape, decreasing in size with distance from the phase mask, and the spacing between the phase mask and the multicore optical fiber is adjusted such that a center of the multicore optical fiber is disposed closer to an apex of the triangular interferogram than to the phase mask.

12. The method as defined in claim 1 wherein a pair of writing beams are used to create an interference pattern and an associated interferogram region.

13. The method as defined in claim 12 wherein the interferogram region is a diamond-shaped region extending through the width of the multicore optical fiber, the diamond-shaped region consisting of an upper triangular portion disposed closer to the beam source and a lower triangular portion disposed further from the beam source, with the spacing between the multicore optical fiber and the beam source adjusted such that the multicore optical fiber is located within the lower triangular portion of the diamond-shaped interferogram region.

14. The method as defined in claim 1 wherein the beam source provides a low coherence beam.

15. The method as defined in claim 1 wherein the beam source includes a multi-aperture mask that is configured to generate a plurality of individual beams to create multiple gratings.

\* \* \* \* \*